United States Patent
Dvir et al.

(10) Patent No.: US 8,111,985 B2
(45) Date of Patent: Feb. 7, 2012

(54) APPARATUS AND METHOD FOR PERFORMING LINE ANALYSIS OF CONTINUOUS DATA SIGNALS

(75) Inventors: Amiad Dvir, Nes-Ziona (IL); Alex Goldstein, Netanya (IL); David Avishai, Nes-Ziona (IL)

(73) Assignee: Broadlight, Ltd., Herzliya (IL)

( * ) Notice: Subject to any disclaimer, the term of this patent is extended or adjusted under 35 U.S.C. 154(b) by 463 days.

(21) Appl. No.: 12/434,051

(22) Filed: May 1, 2009

(65) Prior Publication Data

US 2009/0274455 A1  Nov. 5, 2009

Related U.S. Application Data

(60) Provisional application No. 61/049,771, filed on May 2, 2008.

(51) Int. Cl.
*H04B 10/08* (2006.01)
*H04B 10/00* (2006.01)

(52) U.S. Cl. .......... 398/9; 398/17; 398/25; 398/154; 398/177

(58) Field of Classification Search ............. 398/9, 17, 398/25, 154, 177
See application file for complete search history.

(56) References Cited

U.S. PATENT DOCUMENTS

| 6,263,034 | B1 * | 7/2001 | Kanack et al. ............... 375/371 |
| 7,236,555 | B2 | 6/2007 | Brewer |
| 7,356,077 | B2 | 4/2008 | Fala et al. |
| 2002/0009170 | A1 * | 1/2002 | Schmatz ................. 375/371 |
| 2006/0251200 | A1 | 11/2006 | Miller |

* cited by examiner

*Primary Examiner* — Dawayne A. Pinkney
(74) *Attorney, Agent, or Firm* — Myers Wolin, LLC

(57) ABSTRACT

An apparatus for performing an optical line analysis of continuous data signals. The apparatus comprise a phase position processor for computing a phase early/late indicator; a phase control code processor for computing a difference phase indicator; a frequency extractor for computing a low frequency jitter indicator; and a statistical calculator for computing a plurality of statistical measures regarding frequency and amplitude components of a jitter of an input continuous data signal, wherein the statistical measures are computed based on one of the phase early/late information indicator, the difference phase indicator, or the low frequency jitter indicator.

14 Claims, 6 Drawing Sheets

APPARATUS AND METHOD FOR PERFORMING LINE ANALYSIS OF CONTINUOUS DATA SIGNALS

CROSS-REFERENCE TO RELATED APPLICATIONS

This application claims the benefit of U.S. provisional application No. 61/049,771 filed on May 2, 2008, the contents of which are herein incorporated by reference.

TECHNICAL FIELD

The present invention relates generally to an apparatus and a method for measurement of the quality of signals transmitted in optical transmission systems.

BACKGROUND OF THE INVENTION

Many communication networks that provide high bit-rate transport over a shared medium are characterized by non-continuous, or burst mode, data transmission in the upstream direction and continuous data transmission in the downstream direction. An example of such a network is a passive optical network (PON) 100 schematically shown in FIG. 1. A typical PON 100 includes a plurality of optical network units (ONUs) 120-1 through 120-M coupled to an optical line terminal (OLT) 130 via a passive optical splitter 140. Since all ONUs function in like manner, they will be collectively referred to by the reference numeral 120 in the following description unless reference is made to a specific ONU.

Traffic data transmission is performed over two optical wavelengths, one for the downstream direction and another for the upstream direction. Thus, downstream transmission from the OLT 130 is broadcast to all the ONUs 120. Each ONU 120 filters its respective data according to, for example, pre-assigned labels. Transmission from an ONU 120 to the OLT 130 is in the form of a burst. The OLT 130 continuously transmits downstream data to the ONUs 120 and receives upstream burst data sent to OLT 130 from ONUs 120. The OLT 130 broadcasts data to the ONUs 120 along a common channel so that all the ONUs 120 receive the same data. An ONU 120 transmits data to the OLT 130 during different time slots allocated by the OLT 130. That is, the OLT 130 is aware of the exact arrival time of data and the identity of a transmitting ONU 120.

A PON is typically designed with varied lengths of optical links, splits, cost driven optics, and other physical consideration. Thus a typical PON suffers from optical aberrations influencing the signals. Therefore, appropriate signal processing is required in order to recover the original signal from the received signal and to avoid errors during transmission.

An optical signal sent from an OLT 130 is received by a receiver in the ONU 120 and converted into an analog electrical signal. The ONU's receiver uses a clock and data recovery (CDR) circuit to generate a clock corresponding to the incoming data, thereby correctly retiming the digital incoming data. After recovering the data, a forward error correction mechanism may be utilized to detect and correct errors in the received data and to provide an assessment of the signal quality. However, during the recovery process, essential information, such as eye distortion, frequency movement, phase information, jitter, and other effects are discarded, and thus the quality of the input signal cannot be correctly measured. Therefore, assessment of the signal quality is necessary prior to recovering the signals.

In PON systems there is an increasing demand to perform an optical line analysis to determine the root cause of the PON failures or performance degradation. Results of an optical line analysis can enable PON operators to perform optical layer supervision. The optical supervision allows more efficient operation and maintenance of PON networks, for example, by not sending technicians if the PON system works properly, dispatching the correct technician if a problem is detected, or providing correct diagnostics to the technician.

Optical line analysis of signals can be performed only on signals that are not fully recovered and cannot be performed using conventional techniques for detecting the errors in the received signals.

Therefore, it would be advantageous to provide a solution for performing an optical line analysis in passive optical networks.

SUMMARY OF THE INVENTION

Certain embodiments of the invention include an apparatus for performing an optical line analysis of continuous data signals. The apparatus comprises a phase position processor for computing a phase early/late indicator; a phase control code processor for computing a difference phase indicator; a frequency extractor for computing a low frequency jitter indicator; and a statistical calculator for computing a plurality of statistical measures regarding frequency and amplitude components of a jitter of an input continuous data signal, wherein the statistical measures are computed based on one of the phase early/late information indicator, the difference phase indicator, or the low frequency jitter indicator.

Certain embodiments of the invention also include a method for performing an optical line analysis of continuous data signals. The method comprising computing a phase early/late indicator based on a phase position of an input continuous data signal relative to sampling clock signals; computing a difference phase indicator based on an input phase control code; computing a low frequency jitter indicator based on an input phase control code; and computing a plurality of statistical measures regarding frequency and amplitude components of a jitter of the input continuous data signal, wherein the statistical measures are computed based on one of the phase early/late information indicator, the difference phase indicator, or the low frequency jitter indicator; and analyzing the plurality of statistical measures to detect various failure indicators indicating various malfunctions of the optical line.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
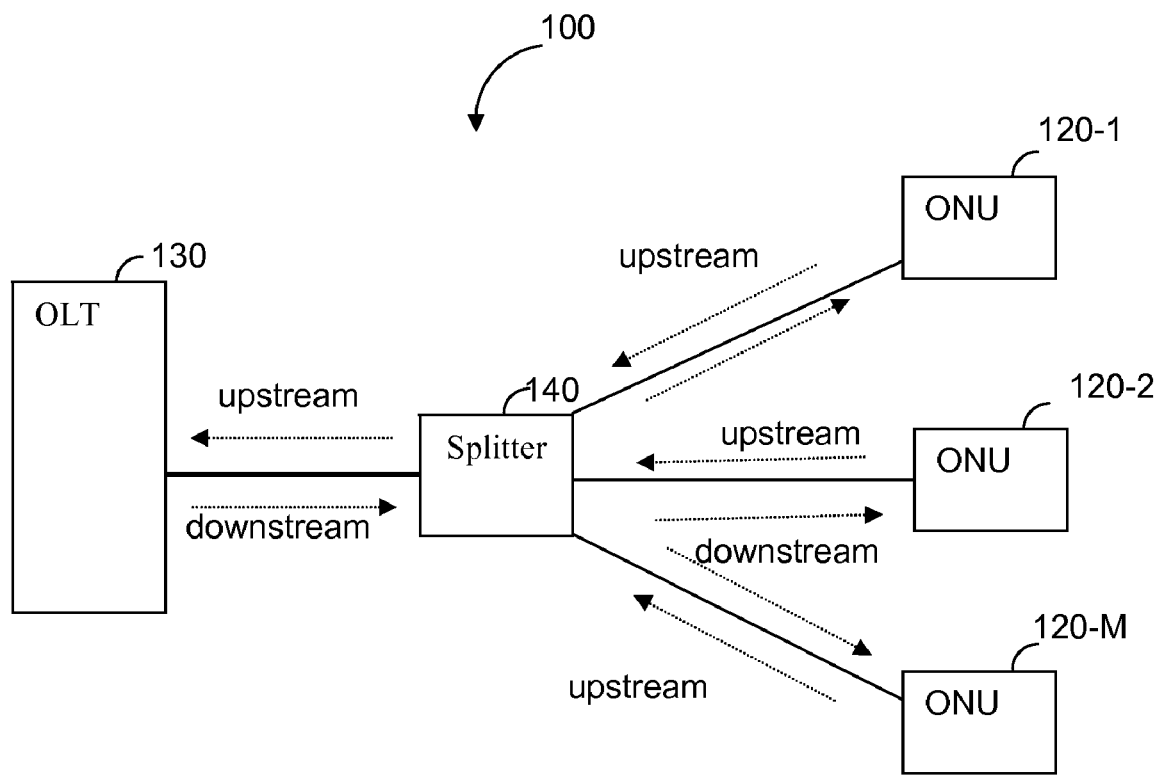
FIG. 1 is a schematic diagram of a passive optical network.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
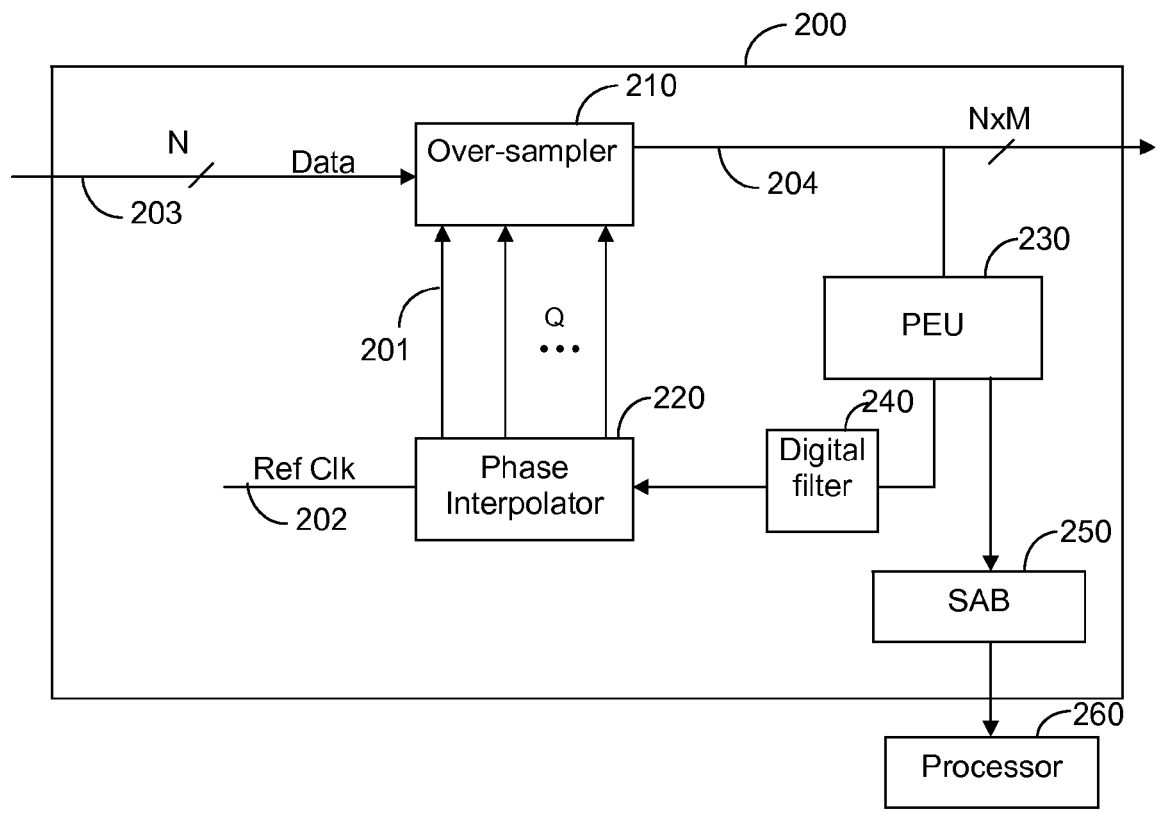
FIG. 2 is a block diagram of a CDR circuit used to describe certain principles of the invention.

FIG. 2 shows a non-limiting block diagram of a CDR circuit 200 used to describe certain principles of the invention. The CDR circuit 200 is based on an over-sampling technique and includes an over-sampler 210, a phase interpolator 220, a phase estimation unit (PEU) 230, a digital filter 240, a statistical accumulation block (SAB) 250, and a processor 260. The phase interpolator 220 is used to generate a number Q (where Q is an integer number greater than 1) of sampling clock signals 201 at the oscillating frequency provided by a reference clock 202, generated by, for example, an oscillator or a recovered clock phase locked loop (PLL) device (not shown in FIG. 2). When the recovered PLL is used one of the signal 201 is input to a PLL (not shown). Each signal 201 is shifted in phase by a factor 1/Q of the clock cycle with respect to the preceding signal. The over-sampler 210 receives an input continuous data signal 203 and using the sampling clock signals 201, the over-sampler 210 generates a bit stream 204 of the recovered data. The data signal may be sent over a PON or a high-speed serial interface.

The PEU 230 receives the bit stream 204, computes and outputs a phase position of the input data signal 203 relatively to signals 201. That is, the PEU 230 provides early/late phase information related to phase of the input data signal 203. The phase position is input into the SAB 250 and the digital filter 240 which computes a phase control code. The phase control code is used to set the phase interpolator 220 with the phase error control code to generate a correct sampling clock signal for future sampling of the input data signal 201. In accordance with an embodiment of the invention setting the phase interpolator 220 with a phase information may be achieved using a phase retrieval unit or a phase mover, as disclosed in co-pending U.S. patent application Ser. No. 11/604,748 entitled "Burst mode clock and data recovery circuit and method" assigned to common assignee and is hereby incorporated by reference for all that it contains.

The phase control code is also fed to the SAB 250. The SAB 250 performs jitter analysis using the input phase position and phase control code information and outputs statistical measures of the jitter frequency and amplitude components in different frequency ranges starting from direct current (DC) to an order of the frequency of the input data. The SAB 250 also computes statistical measures related to the frequency deviation of the reference clock signal 202 and a clock of the input data signal 203. The statistical measures may include, but are not limited to, a maximum value, a minimum value, an average value, an absolute value, a standard deviation value and so on. The operation of the SAB 250 is described in detail below.

The processor 260 aggregates the statistical measures and analyzes the gathered information to detect phenomena that may indicate potential failures in the PON (or any other transport means or transmission line). Failures indicators are reported to the PON operator that may determine, based on indicators reported by other ONUs, the root cause of failures. The processor 260 may be a processor of the ONU. The gathered statistical measures and the processing results may be saved in a memory (not shown).

As a non-limiting example for a failure indicator is a reference clock which is not within a specified locking range of the input data signal. This may indicate on a potential malfunction of the ONU, probably due to degradation of a local oscillator circuit (for the reference clock based PLL), a local narrowband PLL (NB-PLL) that has erratic behavior or a problem in the OLT (for the recovered clock PLL reference clock). This indication may also be reported to a PON operator which can determine, based on reports of other ONUs, if the same problem occurs on all ONUs, certain ONUs, or a single ONU. Using this information the operator can detect the root cause of the unsynchronized clocks problem. As another example, low frequency jitter (e.g., signal having a frequency below 2 KHz) measured by an ONU can indicate either noisy transmission by the OLT (if such phenomenon is reported by all ONUs) or an unstable power source of the ONU. Yet another non-limiting example for a failure indicator, the SAB 250 together with the processor 260 can detect jitter in the acoustic band (e.g., frequency band between 1 KHz and 50 KHz). This may indicate acoustic interferences on the optical line typically caused by winds, noise or pressure that is being put on the fiber (e.g., construction work in the vicinity of the fiber, trains crossing the fiber, and so on). Other interferences may be detected by analyzing high jitter frequency components (e.g., 1 MHz and above).

It should be apparent to one of ordinarily skill in the art that the type of failures described herein are merely examples and other types of failures may be detected using the statistical information generated by the SAB 250. Furthermore, the statistical information may be further processed together with other PON indicators collected, for example, by the OLT. An example for an optical line analysis performed by an OLT is described in co-pending U.S. patent application Ser. No. 11/961,789 entitled "Apparatus and method for measuring the quality of burst signals and performing optical line diagnostics" assigned to common assignee and is hereby incorporated by reference for all that it contains.

Figure 3:
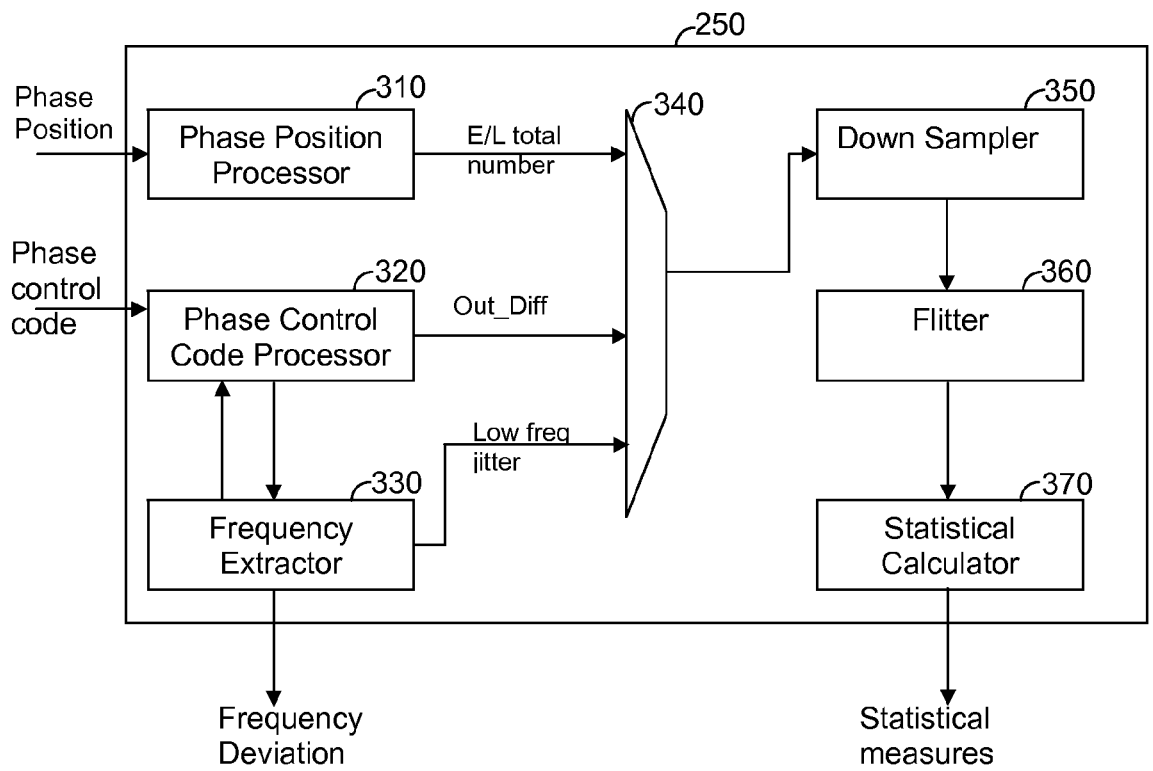
FIG. 3 is a block diagram of the SAB constructed in accordance with one embodiment of the invention.

FIG. 3 shows a non-limiting and exemplary block diagram of the SAB 250 constructed in accordance with one embodiment of the invention. The SAB 250 includes a phase-position processor 310, a phase control-code processor 320, a frequency extractor 330, a multiplexer 340, a down sampler 350, a filter 360, and a statistical calculator 370. The phase position 310 processes the information provided by the PEU 230 and outputs the total number of "early" or "late" bits with respect to phase components of the input signal. For example, if in an input bit stream 6 bits were "late" in phase and 2 bits "early" in phase the total is 4 early bits.

The processor 320 receives the current phase control code from the digital filter 240 and the expected phase code or the previous phase code from the frequency extractor 330 and outputs a normal binary representation calculated difference (Out_Diff) codes. An Out-Diff code may be the difference between the current phase control code and the previous code or the difference between the expected code and the previous code. The phase control code is a data word coded using, for example, a binary code. The Out_Diff is the normal binary representation of the difference. A binary equivalent of the phase control code is output to the frequency extractor 330, which extracts semi-constant phase shift of a very low jitter frequency. Typically, the low jitter frequency is not above 2 KHz. The frequency extractor 330 also measures the frequency deviation (difference) between a clock of the input signal 203 and the reference clock 202.

Figure 4:
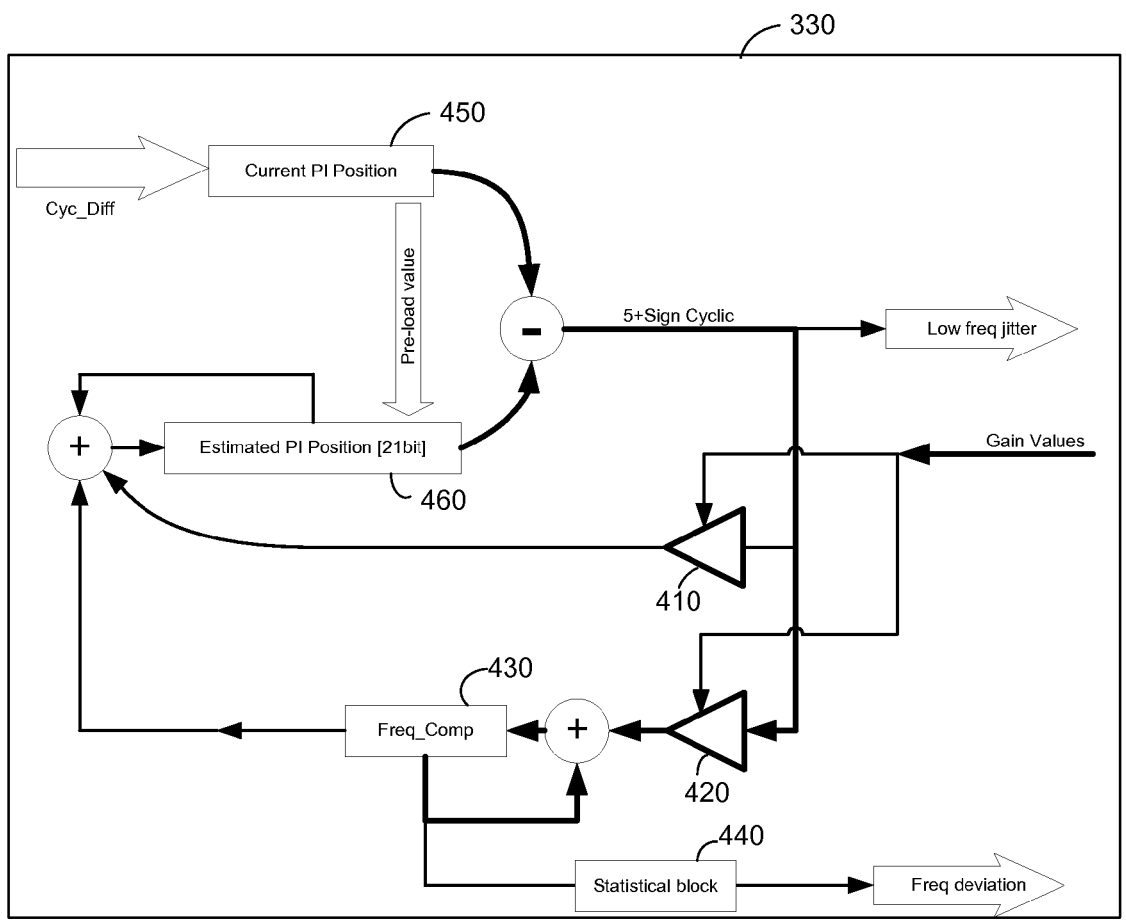
FIG. 4 is a block diagram of the frequency extractor constructed in accordance with one embodiment of the invention.

A non-limiting block diagram of the frequency extractor 330 is provided in FIG. 4. The frequency extractor 330 is a closed loop circuit that includes two configurable amplifiers 410 and 420 that together enable to measure both frequency shifts and low frequency drifts in inputs signals. The statistical block 440 computes at least one of minimum, maximum, absolute and average values of the frequency deviation between the reference clock 202 and a clock the input signal 203 shown in FIG. 2. The output of the statistical block 440 is fed to the processor 260.

Figure 5:
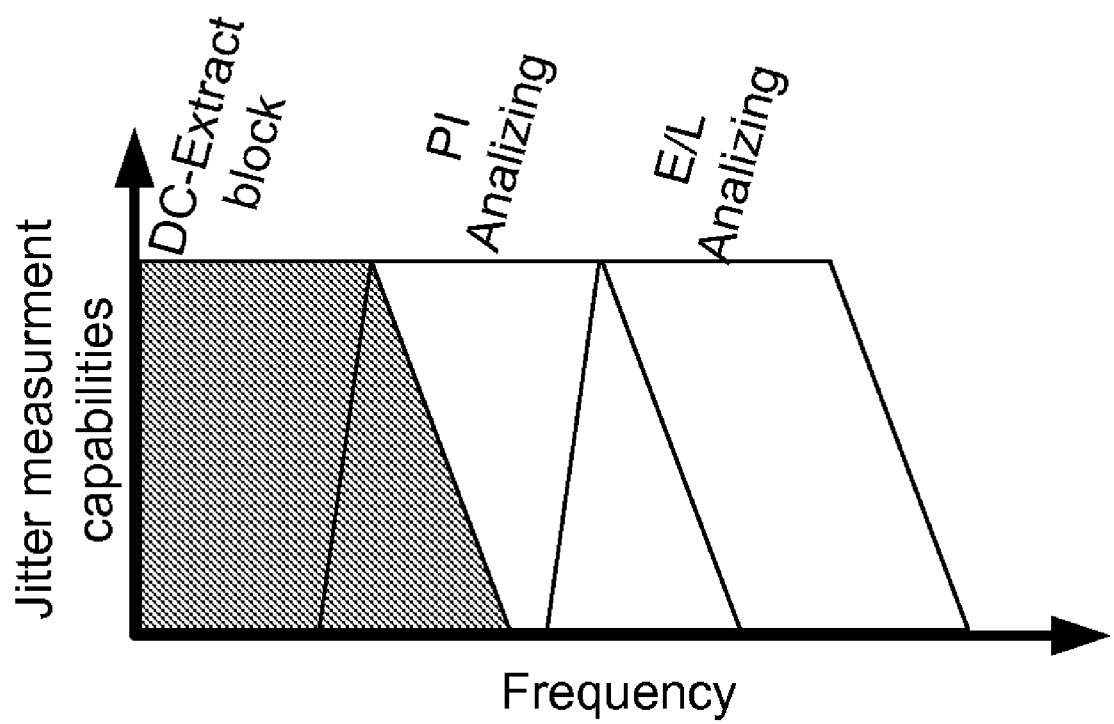
FIG. 5 is a graph showing the jitter analysis in different frequency ranges.

Referring back to FIG. 3, the multiplexer 340 selects which phase indicators, i.e., the outputs of the phase position processor 310, phase control processor 320 and frequency extractor 330, to be input to the down sampler 350 for further processing. As shown in FIG. 5 each of these phase indicators allows analyzing the jitter of input signals in a different frequency range. As a non-limiting example the frequency extractor 330 output can be used to analyze jitter in a frequency range of up to 2 KHz, the Out_Diff value can be used to measure jitter in a frequency band between 2 KHz and 5 MHz and the output of the total early/late number is used for analyzing jitter between 3 MHz to maximum working frequency of the filter 360.

The down sampler 350 is a configurable unit that adapts the frequency of the selected output to a frequency work point of the filter 360. This performs by averaging the data signal according to a configurable parameter. The filter 360 is a configurable filter that passes only signal in a predefined frequency window to be analyzed. In a preferred embodiment the filter 360 maybe a configurable filter structure that can implement either an Infinite impulse response (IIR) a finite impulse response (FIR) and to perform single bin calculation for specific frequency (amplitude) detection.

The statistical calculator 370 computes, in real time, statistical measures related to the frequency and amplitude components of the jitter within a frequency window set by the filter 360. As mentioned above the statistical measures include, but are not limited to, minimum, maximum, absolute, and average values of the frequency component of the jitter as well as minimum, maximum, absolute, and average values of the frequency component of the jitter. In accordance with an embodiment of the invention the SAB 250 can be utilized to measure a transferred jitter of a signal transmitter by an ONU based on at least the phase control code.

Figure 6:
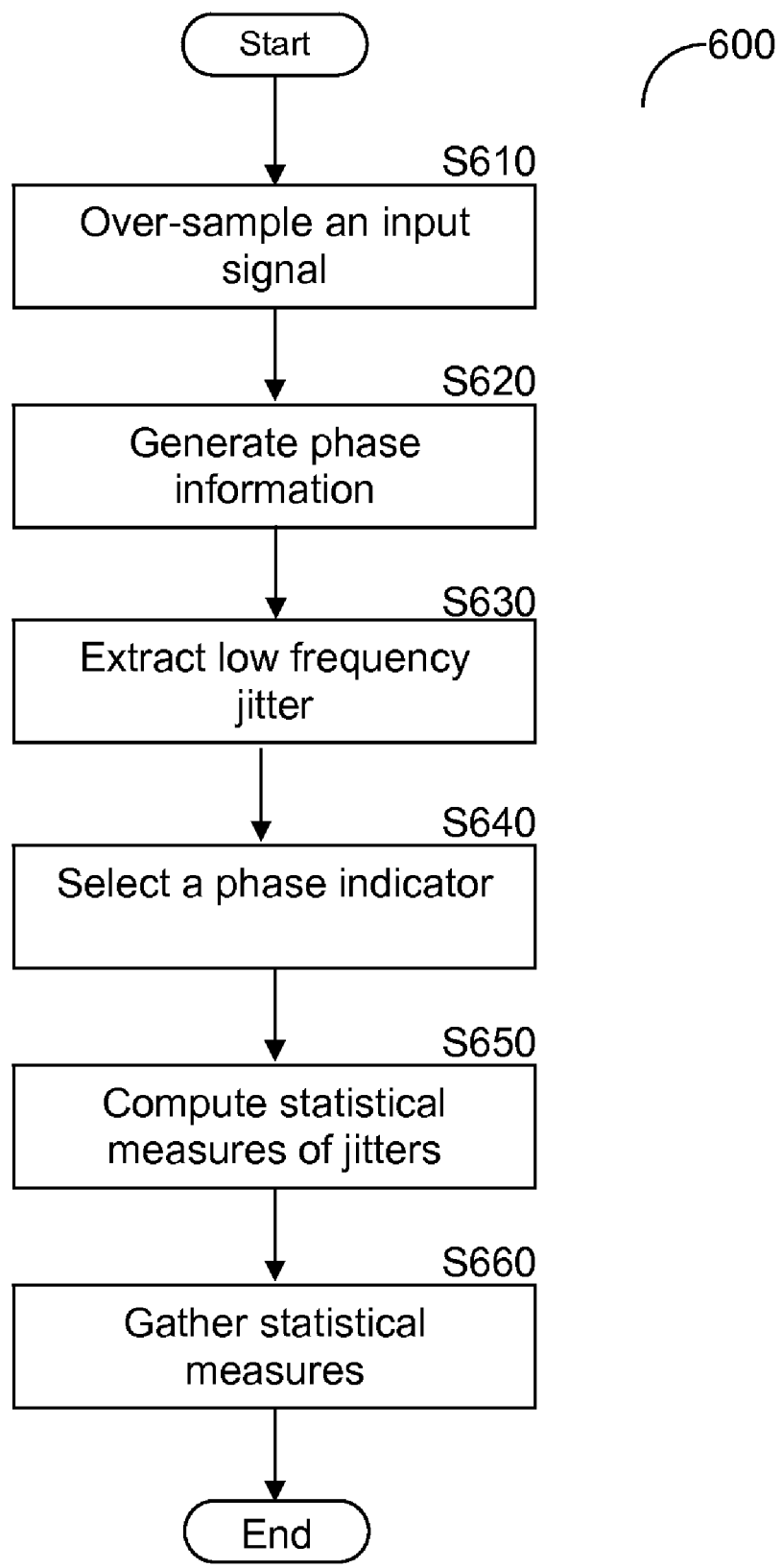
FIG. 6 is a flowchart describing a method for measuring the jitter of a continuous signal.

FIG. 6 shows a non-limiting and exemplary flowchart 600 describing the method for measuring the jitter of continuous data signals implemented in accordance with an embodiment of the invention. At S610 an input continuous signal is over-sampled to generate a sequence of bit streams. At S620, phase information is generated based on the over-sampled stream. Specifically, the phase information includes a phase position (or early/late information) produced by the PEU 230 and a phase control code generated by the digital filter 240. At S630, a low frequency jitter is extracted from the phase control code. At S640, one of the phase indicators including the phase position, phase control code, low frequency jitter are selected to be analyzed. Each of these indicators is used to measure the jitter in a different frequency range. The phase position information can use to analyze jitter in a frequency of above 2 MHz, the phase control code information can be utilized to measure jitter in a frequency range of 1 MHz to 5 MHz, the low frequency jitter can be measured in frequencies between DC to 2 KHz. At S650 various statistical measures including, for example, average, absolute, minimum, and maximum values of the frequency and amplitude jitter components of the input. At S660, the statistical measures are gathered and preferably saved in memory to be further processed to detect failures indicators.

The invention described herein references an exemplary embodiment where a line analysis is performed in optical networks. However, it would be apparent to one of ordinary skill in art that the line analysis is based on a jitter analysis of continuous data signals. Therefore, one of ordinary skill in the art can adapt the disclosed invention to perform line analysis on continuous data received on, for example, a high-speed serial bus including, but not limited to, a Serial ATA (SATA) bus, a Peripheral Component Interconnect express (PCIe) bus, a Universal Serial Bus (USB), a Hypertransport bus, and an Infiniband bus, and the like.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. An apparatus for performing an optical line analysis of continuous data signals, comprising:
   a phase position processor for computing a phase early/late indicator;
   a phase control code processor for computing a difference phase indicator;
   a frequency extractor for computing a low frequency jitter indicator;
   a statistical calculator for computing a plurality of statistical measures regarding frequency and amplitude components of a jitter of an input continuous data signal, wherein the statistical measures are computed based on one of the phase early/late information indicator, the difference phase indicator, and the low frequency jitter indicator; and
   a processor for aggregating the plurality of statistical measures and analyzing the aggregated data to detect various failure indicators indicating various malfunctions of the optical line, wherein the optical line is an optical fiber of a passive optical network (PON), wherein the optical fiber connects an optical line terminal (OLT) to a plurality of optical network units (ONUs) through an optical splitter.

2. The apparatus of claim 1, further comprising:
a down sampler for down sampling one of the phase early/late information indicator, the difference phase indicator, and the low frequency jitter indicator to a frequency work point of a filter; and
a filter for filtering the down sampled signal to a predefined frequency window in which the input continuous data signal is to be analyzed, wherein the output of the filter is fed to the statistical calculator.

3. The apparatus of claim 1, wherein the phase position processor computes the phase early/late indicator based on a phase position of the input continuous data signal relatively to sampling clock signals.

4. The apparatus of claim 1, wherein the phase control code processor computes the difference phase indicator based on an input phase control code.

5. The apparatus of claim 1, wherein the frequency extractor computes the low frequency jitter indicator based on an input phase control code, wherein the low frequency jitter indicator is a binary representation of a frequency deviation between a reference clock and a clock of the input continuous data signal.

6. The apparatus of claim 1, wherein the plurality of statistical measures include at least a maximum value, a minimum value, an absolute value, an average value, and a standard deviation value.

7. The apparatus of claim 1, wherein the various failure indicators include at least: a reference clock that is not within a specified locking range of the input continuous data signal indicating on a potential malfunction of an ONU or an OLT if the same indication was detected for all ONUs; a low frequency measured jitter of an input continuous data signal indicating on either noisy transmission by the OLT or on an unstable power source of the ONU; and a measured jitter of an input continuous data signal is within a acoustic band indicating on acoustic interferences on the optical line.

8. The apparatus of claim 1, wherein the various failure indicators are reported to a PON operator.

9. The apparatus of claim 1, wherein the optical line carries data of a high-speed serial bus, wherein the high-speed serial bus comprises at least a Serial ATA (SATA) bus, a Peripheral Component Interconnect express (PCIe) bus, a Universal Serial Bus (USB), a Hypertransport bus, and an Infiniband bus.

10. The apparatus of claim 1, is further capable to measure a transferred jitter of a signal transmitter by an ONU based on at least the phase control code.

11. A method for performing an optical line analysis of continuous data signals comprises:
computing a phase early/late indicator based on a phase position of an input continuous data signal relative to sampling clock signals;
computing a difference phase indicator based on an input phase control code;
computing a low frequency jitter indicator based on an input phase control code; and
computing a plurality of statistical measures regarding frequency and amplitude components of a jitter of the input continuous data signal, wherein the statistical measures are computed based on one of the phase early/late information indicator, the difference phase indicator, and the low frequency jitter indicator;
analyzing the plurality of statistical measures to detect various failure indicators indicating various malfunctions of the optical line, wherein the optical line is an optical fiber of a passive optical network (PON), wherein the optical fiber connects an optical line terminal (OLT) to a plurality of optical network units (ONUs) through an optical splitter;
down sampling one of the phase early/late information indicator, the difference phase indicator, or the low frequency jitter indicator to a frequency work point of a filter; and
filtering the down sampled signal to a predefined frequency window in which the input continuous data signal is to be analyzed.

12. The method of claim 11, wherein the various failure indicators include at least: a reference clock that is not within a specified locking range of the input continuous data signal indicating on a potential malfunction of an ONU or an OLT if the same indication was detected for all ONUs; a low frequency measured jitter of an input continuous data signal indicating on either noisy transmission by the OLT or on an unstable power source of the ONU; and a measured jitter of an input continuous data signal is within a acoustic band indicating on acoustic interferences on the optical line.

13. The method of claim 11, wherein the various failure indicators are reported to a PON operator.

14. A non-transitory computer readable medium having stored thereon computer exactable code when executed by a processor causing the processor to perform the process of:
performing an optical line analysis of continuous data signals comprises:
computing a phase early/late indicator based on a phase position of an input continuous data signal relatively to sampling clock signals;
computing a difference phase indicator based on an input phase control code;
computing a low frequency jitter indicator based on an input phase control code; and
computing a plurality of statistical measures regarding frequency and amplitude components of a jitter of the input continuous data signal, wherein the statistical measures are computed based on one of the phase early/late information indicator, the difference phase indicator, and the low frequency jitter indicator;
analyzing the plurality of statistical measures to detect various failure indicators indicating on various malfunctions of the optical line, wherein the optical line is an optical fiber of a passive optical network (PON), wherein the optical fiber connects an optical line terminal (OLT) to a plurality of optical network units (ONUs) through an optical splitter;
down sampling one of the phase early/late information indicator, the difference phase indicator, or the low frequency jitter indicator to a frequency work point of a filter; and
filtering the down sampled signal to a predefined frequency window in which the input continuous data signal is to be analyzed.

* * * * *